United States Patent [19]

Provost et al.

[11] Patent Number: 4,629,340
[45] Date of Patent: Dec. 16, 1986

[54] ROLLER BEARING ASSEMBLY

[76] Inventors: Richard R. Provost, 827, 3ième Avenue, Pointe-aux-Trembles, Montreal, Quebec, Canada, H1B 4P4; Claude Provost, 43 Place Montmorency, Laval des Rapides, Quebec, Canada, H7N 1T4

[21] Appl. No.: 764,726

[22] Filed: Aug. 12, 1985

[30] Foreign Application Priority Data

Nov. 20, 1984 [CA] Canada ................. 468248

[51] Int. Cl.$^4$ .................. F16C 19/40; F16C 19/50
[52] U.S. Cl. ................... 384/554; 384/450; 384/550; 384/565
[58] Field of Search ........ 384/450, 461, 548, 550–555, 384/565–568, 569

[56] References Cited

U.S. PATENT DOCUMENTS

| | | | |
|---|---|---|---|
| 9,926 | 8/1853 | Patterson | 384/551 |
| 34,962 | 4/1862 | Holmes | 384/553 |
| 96,720 | 11/1869 | Parry | 384/450 |
| 609,526 | 8/1898 | Thierry | 384/555 |
| 725,620 | 4/1903 | Henderson | 384/553 |
| 1,222,534 | 4/1917 | Cormier | 384/550 |
| 1,381,811 | 6/1921 | Denton | . |
| 1,423,304 | 7/1922 | Burns | . |
| 1,510,920 | 10/1924 | Bronander | 384/565 |
| 1,667,348 | 4/1928 | Foley | 384/552 |
| 1,973,994 | 9/1934 | Peterson | 384/568 |
| 3,261,234 | 7/1966 | Broschard et al. | 74/801 |
| 3,306,686 | 2/1967 | Nasvytis | 384/548 |
| 3,974,718 | 8/1976 | Kylberg | 74/750 |
| 3,998,506 | 12/1976 | Traut | 384/550 |
| 4,043,210 | 8/1977 | Updegrave | 74/750 |
| 4,136,580 | 1/1979 | Brand et al. | 74/665 |

FOREIGN PATENT DOCUMENTS

| | | | |
|---|---|---|---|
| 71342 | 5/1901 | Canada | . |
| 82443 | 8/1903 | Canada | . |
| 139287 | 3/1912 | Canada | . |
| 176367 | 4/1917 | Canada | . |
| 196246 | 12/1919 | Canada | . |
| 242899 | 9/1924 | Canada | . |
| 254564 | 10/1925 | Canada | . |
| 793715 | 9/1968 | Canada | . |
| 906785 | 8/1972 | Canada | 74/195 |
| 944424 | 3/1974 | Canada | . |
| 961903 | 1/1975 | Canada | . |
| 47-42694 | 10/1972 | Japan | 384/461 |

Primary Examiner—Stuart S. Levy
Assistant Examiner—Thomas R. Hannon
Attorney, Agent, or Firm—Robic, Robic & Associates

[57] ABSTRACT

An improved roller bearing assembly of the type comprising an inner race having a cylindrical riding track; an outer race coaxial with the inner race, having an inner cylindrical riding track facing the outer riding track of the inner race; and a series of rollers mounted between the riding tracks. This roller bearing assembly is improved in that each of its rollers has at least two cylindrical riding surfaces of different radii, the cylindrical riding surface of longer radius exclusively contacting the outer race riding track while the cylindrical riding surface of smaller radii exclusively contacts the inner race riding track. The radius of the riding track of the outer race equals the sum of the radius of the riding track of the inner race plus the longer and smaller radii of the riding surfaces of one roller. The ratio of the radius of the riding track of the outer race over the radius of the riding track of the inner race equals the ratio of the longer radius over the shorter radius.

2 Claims, 10 Drawing Figures

ROLLER BEARING ASSEMBLY

BACKGROUND OF THE INVENTION (a) Field of the invention

The object of the present invention relates to a new and compact roller bearing assembly whose structural characteristics allow a substantial reduction of friction that is usually noted in present roller bearing assemblies.

SUMMARY OF THE INVENTION

More particularly, the object of the present invention lies in a low-friction roller bearing assembly generating low vibrations, noises and/or heating levels, keeping its features constant with time, not being significantly affected by extreme temperature changes and capable of standing very high revolutions.

Such roller bearing assemblies are advantageously useful wherever it is needed to reduce axial play in an engine, a turbine and transmissions comprising belts and/or flywheels; or to replace electric brush contacts in electric motor or generator, when assembled by a method where every constitutive parts of said assembly are subjected to different temperatures whereby reducing machining margins.

The above-mentioned advantages are made possible in a roller bearing assembly according to the present invention, said assembly comprising:
an inner race having an outer cylindrical riding track;
an outer race coaxial with said inner race, having an inner cylindrical riding track facing said outer riding track of said inner race;
a series of rollers mounted between said riding tracks;
wherein each of said rollers has at least two cylindrical riding surfaces of different radii, the cylindrical riding surface of longer radius exclusively contacting said outer race riding track while the cylindrical riding surface of the smaller radius exclusively contacts said inner race riding tracks;
wherein the radius of said riding track of said outer race equals the sum of the radius of the riding track of the inner race plus said longer and smaller radii of said riding surface of said rollers; and
wherein the ratio of the radius of said riding track of said outer race over the radius of said riding track of said inner race equals the ratio of said longer radius over said shorter radius.

Preferably, each of the rollers has at least one central riding surface of predetermined radius and two end riding surfaces, on either side of said central riding surface and of equal radii different from the radius of said central riding surface.

According to a first variant of the invention, each roller of the assembly has one central riding surface of a smaller radius than the equal radii of said end riding surfaces. This central riding surface is separated from said end riding surfaces by radial shoulders. Also, this central riding surface has a width at least equal to the width of the riding track of said inner race. This inner race (which may be further provided with a coaxial bore) has radial faces connecting its riding track and its center of rotation (or its coaxial bore).

Preferably, for reducing frictions between said radial shoulders of the rollers and said radial faces of the inner race, either said race has radial faces diverging from each other, with respect to the center of rotation of said race, or said rollers have radial shoulders diverging from each other, with respect to the center of rotation of said rollers. Advantageously, at once said inner race has radial faces diverging from each other, at least in the vicinity of the riding track of said race and with respect to the center of rotation of said race, and said rollers have radial shoulders diverging from each other with respect to the center of rotation of said rollers.

According to a second variant of the invention, each of the rollers has one central riding surface of longer radius than the equal radii of said end riding surfaces. This central riding surface is separated from said end riding surfaces by radial shoulders. For avoiding contact between said central riding surface of each of the rollers and the inner race, this latter, centrally with the width of its riding track, is provided with a circumferential groove. This groove has a given depth and width, a bottom and radial faces connecting said bottom and said inner race riding track. The depth of this groove is at least slightly greater than the absolute value of the difference of radius existing between the longer and the shorter radii of the riding surface of any of the rollers. The width of said bottom is at least equal to the width of the central riding surface of said rollers.

For reducing frictions between the radial faces of said groove of the inner race and the radial shoulders of any of said rollers, either said radial faces are spaced apart at a width sufficient to avoid any contact with said shoulders and at least slightly greater than the width of said central riding surface of any of said rollers (except in the vicinity of the riding track where both widths may be nearly the same); or said radial shoulders of each of the rollers, converge toward each other with respect to their center of rotation.

Preferably, at once said radial shoulders converge toward each other with respect to their center of rotation and said radial faces are spaced apart at a width slightly greater than the width at which said end riding surfaces of any of said rollers are spaced apart, except in the vicinity of the riding track of said inner race, where both widths are nearly the same.

The outer race of the assembly of any aforementioned variants, is provided with a bore defining an inner cylindrical surface to said race. Though this surface generally defines the riding track of said race, it may be optionally provided with at least one circumferential groove having a flat bottom and lateral bordering faces connecting said bottom and said bore. These bordering faces are moving away from each other with respect to said bottom. Also, the bottom of said groove is defining the riding track of said outer race, and has a width at least equal to either the width at which the end riding surface of longer radius of each roller are spaced apart, or the width of said central riding surface of longer radii of any of said rollers.

Preferably, the outer race of any aformentioned variants is constituted of two distinct parts joined by any appropriate means known of the skilled workman (i.e. bolts, rings, etc.).

Preferably, each of the rollers has such a height that the total width of each riding surfaces of same radius, represents about one half of said height.

Advantageously, each riding surface of different radii of any of said rollers, is separated from an adjacent riding surface of the same roller by a radial shoulder defining a coaxial frustum of a cone.

Because unavoidable machining margins in all parts of said roller bearing assembly, it may be advantageous to allow a certain clearance between them. The size of this clearance may be more or less accentuated depending on the fact that said assembly is either assembled according to a method where all its constitutive parts are at the same temperature, or assembled according to a method where said parts are at different temperature.

Each roller used to embody the roller bearing assembly of the invention, may be advantageously manufactured either by machining a single piece, or by machining and concentrically assembling several pieces, said piece(s) being eventually emptied, for thus obtaining a roller that fully meets with the specification of the invention. Of course, this roller is manufactured according to the technics well known to the skilled workman. Therefore, each roller used in the roller bearing assembly of the invention, is either constituted of a single piece, full or emptied, provided with at least two cylindrical riding surfaces of different radii, or constituted of two or more coaxial pieces, full or emptied, respectively provided with at least one of said cylindrical riding surfaces.

Advantageously, for avoiding frictions between neighboring rollers of said assembly, said rollers are kept at distance from each other. Such frictions between neighboring rollers may result of the mutual contact of two neighboring rollers pursuant to their relative motion within said assembly, because aforementioned machining margins. For keeping said rollers at a predetermined position within said assembly, they may be inserted in a cage, and preferably a cage of the type where a force is applied against each of the rollers to keep them at a determined distance from each other.

Also, the cage may be of the type provided with small rollers, each small rollers having its axis of rotation positioned on a fictive line binding the axis of rotation of the neighboring rollers. The diameter of these small rollers is such that they never come into contact with the riding track of the inner race.

The cylindrical surfaces of contact defining the riding surfaces of said rollers and/or the riding tracks of said races, may be optionally provided with teeth. Though the use of teeth substantially create frictions and reduce as much the efficiency of said assembly, this use however shows the advantage of not requiring a cage for the positioning of rollers within said assembly. Indeed, the rollers are then positioned at each tooth so as they cannot have relative motion with respect to each other.

Of course, either the riding track of said inner race and the riding surfaces of smaller radius of said rollers may be provided with teeth, and/or the riding track of said outer race and the riding surfaces of longer radius of said rollers may be provided with teeth. Preferably, at once said riding track of said inner race and said riding surfaces of smaller radius of said rollers are provided with teeth, and said riding track of said outer race and said riding surfaces of longer radius of said rollers are provided with teeth.

According to a third variant of the invention, the rollers of said assembly are kept at distance from each other by means of spacing rollers. Therefore, between each roller of said assembly is positioned at least one spacing roller whose the cylindrical surface of contact is of such a diameter that it prevents the riding surfaces of longer radius of two corresponding neighboring rollers to come into mutual contact. Furthermore, at least one crown having one cylindrical surface of contact keeps said spacing rollers against their corresponding rollers. Therefore, each spacing roller at once contacts one riding surface of two corresponding rollers and the cylindrical surface of said crown.

The crown exclusively contacts said spacing rollers. Also, as the spacing rollers have the same diameter, they have the same speed of rotation to thus avoid sliding between said crown and said spacing rollers.

Of course, said spacing rollers are manufactured according to methods similar to the ones used for the manufacturing of any other rollers of said assembly.

Said spacing rollers as well as said corresponding crown(s), are housed within the holes existing between said rollers of said assembly and said inner race or outer race. Preferably, when at least two spacing rollers are positioned between each of said rollers of said assembly, they are housed within said holes existing between said inner race and said rollers of said assembly and said holes existing between said outer race and said rollers of said assembly, respectively.

Optionally, at least one of said inner race and outer race of the assembly is provided, in its riding track, with a circumferential groove increasing the volume of said holes and thus defining a wide enough passageway for said rollers and corresponding crown(s). Such a passageway allows to use spacing rollers and crown(s) of larger diameter while avoiding any contact of said spacing rollers and crowns with said inner race and/or outer race.

Preferably, each roller of said assembly is provided, in a portion of one of its riding surface with a circumferential groove of small depth. This circumferential groove is intended to receive the cylindrical surface of contact of said corresponding spacing rollers. Also, this groove has a flat bottom and radial faces connecting said bottom and said riding surface of the roller, and each spacing roller has radial faces connecting said cylindrical surface of contact and its center of rotation.

Advantageously, for reducing frictions between said radial faces of said groove of the rollers and said radial faces of each spacing rollers engaged in said groove, either said radial faces of each of said spacing rollers diverge from each other with respect to the center of rotation of said spacing roller; and/or said radial faces of said groove of each of said rollers of said assembly diverge from each other, with respect to the center of rotation of said roller.

Preferably, at once said radial faces of each of said spacing rollers diverge from each other at least in the vicinity of said cylindrical surface of contact and with respect to the center of rotation of said spacing roller, and said radial faces of said groove of said rollers of said assembly diverge from each other, with respect to the center of rotation of said roller, to whereby avoid friction therebetween.

Preferably, each of said spacing rollers may be provided, in its cylindrical surface of contact, with a groove of small depth, said groove having a flat bottom of given width and radial faces connecting said bottom and said cylindrical surface of contact. This groove is intended to receive the cylindrical surface of contact of said corresponding crown. Also, this crown has radial faces bordering its cylindrical surface of contact.

Advantageously, for reducing frictions between said radial faces of each of said spacing rollers and said radial faces of said crown, either said radial face of said crown diverge from each other toward the cylindrical surface of contact of said crown, or said radial faces of said spacing rollers diverge from each other with respect to their center of rotation. Preferably, at once said radial faces of said crown diverge from each other toward the cylindrical surface of contact of said crown, and said radial faces of said spacing rollers diverge from each other with respect to their center of rotation.

The material usable to embody any of the constitutive parts of said roller bearing assembly according to the present invention, may advantageously be selected amongst the metals and their alloys showing good properties of resistance to wearing and compression,(i.e. steel) , or else amongst some plastics showing similar properties. Of course, the selection of material is carried out according to the expected conditions of use for the roller bearing assembly of the invention. Furthermore, depending on said expected use, the skilled workman may choose to lubricate said roller bearing assembly.

Advantageously, all cylindrical surfaces of contact of said roller bearing assembly are slick for thus reducing frictions and allowing the use of plastic materials, the risk of flowing of said plastic materials being then proportionally reduced.

Advantageously, the contour of at least one of said cylindrical surfaces of contact (riding surfaces and riding tracks are of course included within the meaning of said cylindrical surfaces of contact) of any of the constitutive parts of said assembly (said parts being selected amongst rollers, inner race, outer race, spacing rollers and crowns) are slightly curved to minimize frictions that may occur at the point of contact of two corresponding contours. Of course, the contour of all cylindrical surfaces of contact of any aformentioned parts may be slightly curved.

BRIEF DESCRIPTION OF THE DRAWINGS

The present invention will be better understood with reference to the following non-restrictive description of preferred embodiments thereof, taken in connection with the accompanying drawings in which:

FIG. 5 is a cross-sectional view, taken along line II—II of FIG. 1, of a roller bearing assembly according to a fourth embodiment of the invention;

FIG. 6 is a cross-sectional view, taken along line II—II of FIG. 1, of a roller bearing assembly according to a fifth embodiment of the invention;

FIGS. 6a and 6b are encircled enlarged views of the points of contact of riding surfaces of the rollers with riding tracks of the races, illustrating the presence of teeth on said surfaces or tracks of the roller bearing assembly of FIG. 6;

Figure 1:
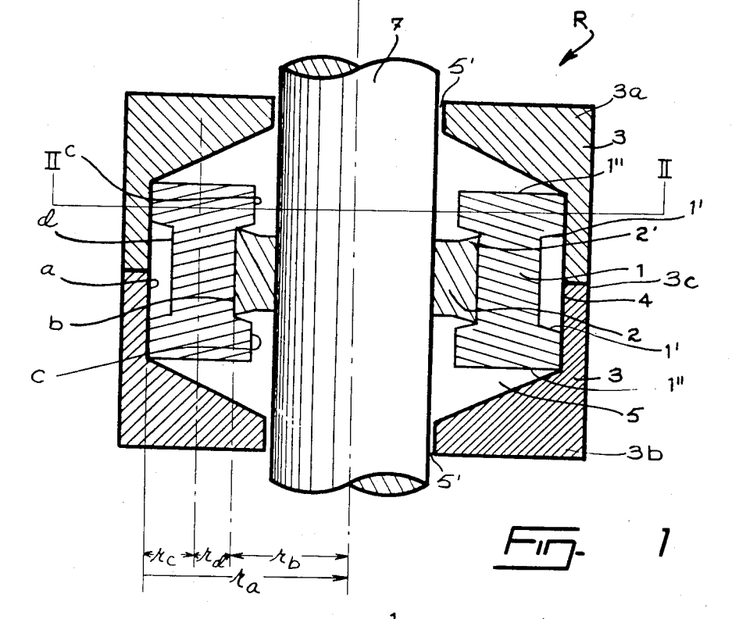
FIG. 1 is a cross-sectional view, taken along line I—I of FIG. 2, of a first embodiment of the invention.
Figure 2:
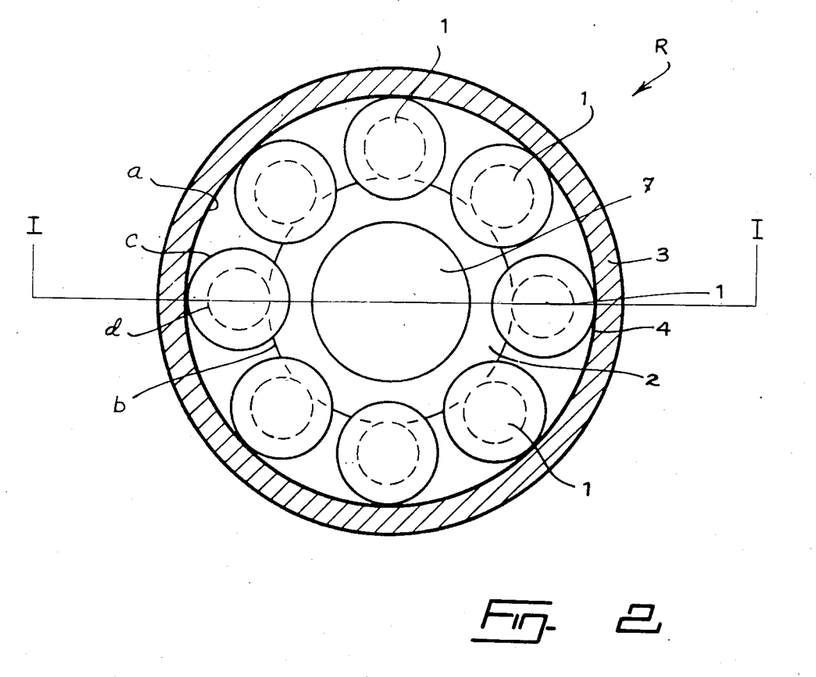
FIG. 2 is a cross-sectional view, taken along line II—II of FIG. 1, of the embodiment of FIG. 1.

The roller bearing assembly "R", shown in FIGS. 1 and 2, has at least three rollers 1, preferably eight as shown. The rollers 1 are planetary positioned between an inner race 2, secured on a rotary shaft 7, and an outer race 3. The inner race 2 has an outer cylindrical riding track b and the outer race 3 has an inner cylindrical riding track a. Each roller 1 has, on the other hand, a riding surface d that rolls on the riding track b of the inner race 2 and two further riding surfaces c that roll on the riding track a of the outer race 3.

The radius of the riding track b on the inner race is $r_b$, with respect to the axis of the shaft 7, while the radius of the riding track a of the outer race 3 is a $r_a$, again with respect to the axis of the shaft 7.

On the other hand, the radius of the riding surfaces c is $r_c$, with respect to the axis of the roller 1 while the radius of the riding surface d is $r_d$ with respect to the axis of the roller 1. Thus:

riding track a has a radius $r_a$,
riding track b has a radius $r_b$,
riding surfaces c have radius $r_c$, and
riding surface d has a radius $r_d$.

The riding track a is defined by the flat bottom 4 of a circumferential groove 5. This groove 5 has been formed in the cylindrical surface of the bore 5' of the outer race 3. Also for optimizing the lowering of frictions in the roller bearing assembly <R>, the race 2 has radial faces 2' that diverge from each other with respect to their center of rotation, in the vicinity of the riding track b, and the riding surfaces c and d of radius $r_c$ and $r_d$ of each roller 1 are separated by radial shoulders 1' that diverge from each other, with respect to the axis of rotation of the roller.

According to the invention, radii $r_a$, $r_b$, $r_c$ and $r_d$ are related to the following equations:

$$r_a = r_b + r_d + r_c \text{ and}$$

$$r_a/r_b = r_c/r_d$$

With the above relationship, there is a minimal amount of sliding between the riding surfaces of the rollers 1 and riding tracks of the races 2 and 3, when said roller bearing assembly <R> is in operation. The outer race 3 is made of two similar and concentric parts 3a and 3b that are joined, along common faces 3c, by means well known to the skilled workman.

As will be seen, the association of radial faces 2', radial faces of the circumferential groove 5, upper and lower radial faces 1" of the roller 1 and radial shoulders 1' of the rollers 1, allows to keep the axial positioning of races 2 and 3 and rollers 1, when the load of the roller bearing assembly <R> is not perpendicular to its axis of rotation.

Figure 3:
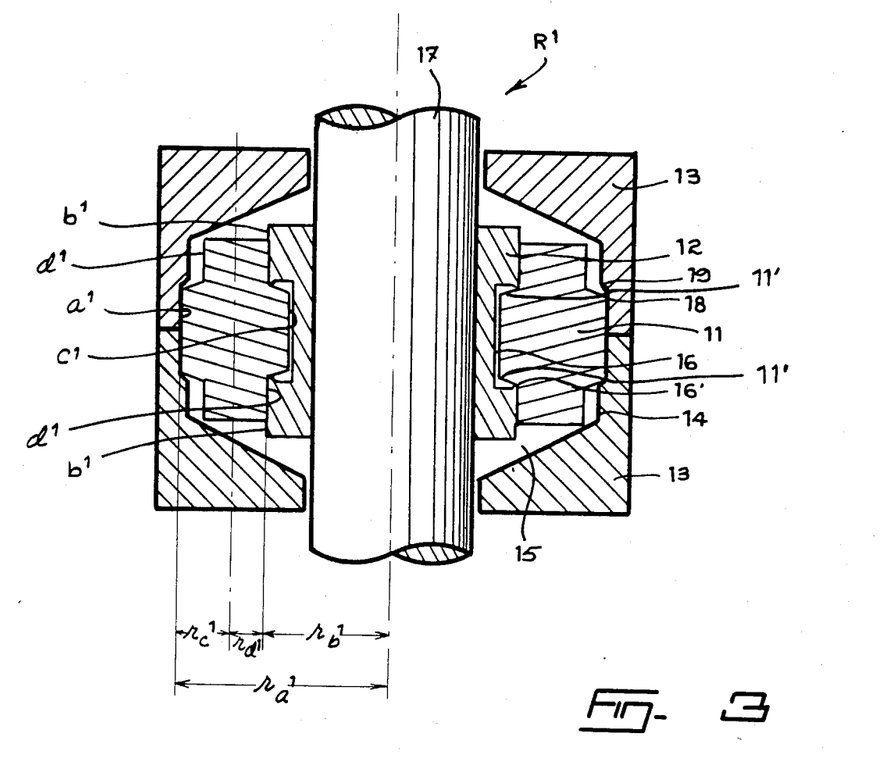
FIG. 3 is a cross-sectional view, taken along line I—I of FIG. 2, of a roller bearing assembly according to a second embodiment of the invention.

The roller bearing assembly <R$^1$> shown in FIG. 3 has at least three rollers 11, preferably eight as shown. The rollers 11 are planetary positioned between an inner race 12, secured on a rotary shaft 17, and an outer race 13. The inner race 12 has two outer cylindrical riding tracks b$^1$ and the outer race 13 has an inner cylindrical riding track a$^1$. Each roller 11 has, on the other hand, two riding surfaces d$^1$ that roll on the corresponding riding tracks b$^1$ on the inner race 12, and one riding surface c$^1$ that rolls on the riding track a$^1$ of the outer race 13.

The radius of the riding track a$^1$ of the outer race 13 is $r_a{}^1$, with respect to the axis of the shaft 17, while the radius of the riding tracks b$^1$ of the inner race 12 is $r_b{}^1$, again with respect to the axis of the shaft 17.

On the other hand, the radius of the riding surface c$^1$ is $r_c{}^1$, with respect to the axis of the roller 11 while the radius of the riding surfaces $d^1$ is $r_d{}^1$ with respect to the axis of the roller 11. Thus:

riding track $a^1$ has radius $r_a{}^1$
 riding tracks $b^1$ have radius $r_b{}^1$
 riding surface $c^1$ has radius $r_c{}^1$, and
 riding surfaces $d^1$ have radius $r_d{}^1$.

The race 13 has a circumferential groove 15 whose bottom 14 is further provided with another circumferential groove of low depth 18. This groove 18 has a flat bottom that is defining the riding track $a^1$ of said race 13, and bordering faces 19 moving away from each other, with respect to said track $a^1$. Furthermore, in each roller 11, the riding surface $c^1$ is separated from the riding surfaces $d^1$ by radial shoulders 11'. These shoulders 11' converge toward each other with respect to the axis of the roller.

Once more, it is important that aforesaid radii be related to the following equations:

$$r_a{}^1 = r_b{}^1 + r_d{}^1 + r_c{}^1 \text{ and}$$

$$r_a{}^1/r_b{}^1 = r_c{}^1/r_d{}^1$$

With the above relationship, practically no sliding is noted between said rollers 11 and races 12 and 13.

Of course, the inner race 12 is provided with a circumferential groove 16 whose depth is greater than the value of the difference of radii $r_c{}^1$ minus $r_d{}^1$, so that the riding surface $c_1$ never contacts the race 12. This groove 16 has radial faces 16' spaced apart at a width slightly greater than the width at which riding surfaces $d^1$ are spaced apart, except in the vicinity of the riding tracks $b^1$ where a portion of said radial faces 16' converge toward each other, with respect to their center of rotation, so as both widths be nearly the same.

Furthermore, the grooves 18 and 16 and the shoulders 11' allow to keep the axial positioning of races 12 and 13 and rollers 11 when the load of the rollers bearing assembly $<R^1>$ is not perpendicular to its axis of rotation.

Figure 4:
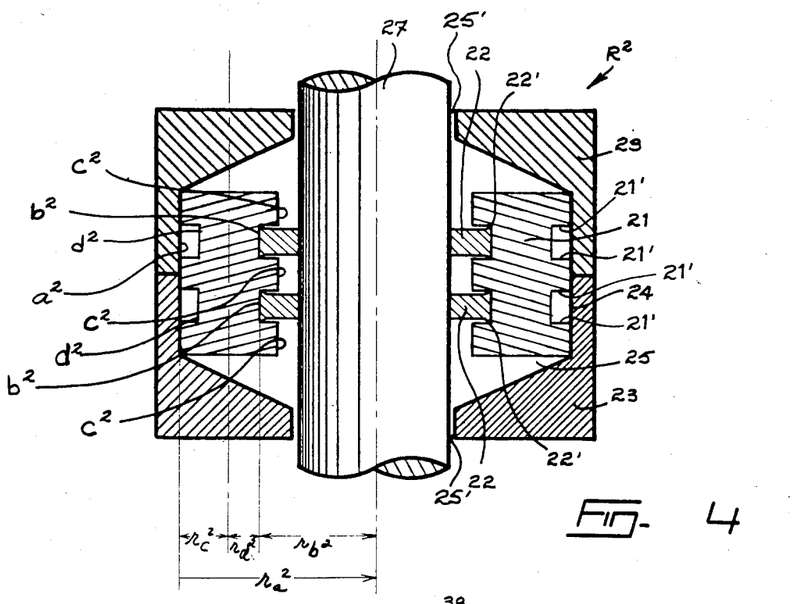
FIG. 4 is a cross-sectional view, taken along line I—I of FIG. 2, of a roller bearing assembly according to a third embodiment of the invention.

The roller bearing assembly $<R^2>$, shown in FIG. 4, is similar to the roller bearing assembly $<R>$ shown in FIGS. 1 and 2, and has eight rollers 21 planetary positioned between two inner races 22, secured on a rotary shaft 27, and an outer race 23. As previously pointed out, the number of rollers 21 is let to the discretion of the skilled workman but must be of at least three. Each inner races 22 has an outer cylindrical riding track $b^2$ and the outer race 23 has an inner cylindrical riding track $a^2$. Each roller 21 has, on the other hand, two riding surfaces $d^2$ that roll on the corresponding riding track $b^2$ of the inner races 22 and three further riding surfaces $d^2$ that roll on the riding track $a^2$ of the outer race 23.

The radius of the riding track $b^2$ of each inner race 22 is $r_b{}^2$, with respect to the axis of the shaft 27, while the radius of the riding track $a^2$ of the outer race is $r_a{}^2$, again with respect to the axis of the shaft 27.

On the other hand, the radius of the riding surfaces $c^2$ are $r_c{}^2$, with respect to the axis of the roller 21, while the radius of the riding surfaces $d^2$ are $r_d{}^2$, with respect to the axis of the roller 21. Thus:

riding track $a^2$ has radius $r_a{}^2$
 riding tracks $b^2$ have radius $r_b{}^2$
 riding surfaces $c^2$ have radius $r_c{}^2$ and
 riding surfaces $d^2$ have radius $r_d{}^2$.

The riding surfaces $c^2$ and $d^2$ of radius $r_c{}^2$ and $r_d{}^2$, of each roller 21 are separated by radial shoulders 21' perpendicular with respect to the axis of the roller 21.

Each race 22 has radial faces 22' that diverge from each other, in the vicinity of the riding track $b^2$, with respect to their center of rotation.(Optionally, radial shoulders 21' may diverge from each other with respect to their axis of rotation, and radial faces 22' are perpendicular to their axis of rotation.) Also, the riding track $a^2$ is defined by the flat bottom 23 of a circumferential inner groove 25. This groove 25 has been formed in the cylindrical surface of the bore 25' of the outer race 23.

According to the invention, radii $r_a{}^2$, $r_b{}^2$, $r_c{}^2$ and $r_d{}^2$ are related to the following equations:

$$r_a{}^2 = r_b{}^2 + r_d{}^2 + r_c{}^2 \text{ and}$$
$$r_a{}^2/r_b{}^2 = r_c{}^2/r_d{}^2$$

With the above relationship, there is a minimum amount of sliding between rollers 21 and races 22 and 23, when said roller bearing assembly $<R^2>$ is in operation.

The roller bearing assembly $<R^3>$ shown in FIG. 5, is similar to the roller bearing assembly $<R>$ shown in FIGS. 1 and 2, and has eight rollers 31 planetary positioned between an inner race 32, secured on a rotary shaft 37, and an outer race 33. The inner race 32 has an outer cylindrical riding track $b^3$ and the outer race 33 has an inner cylindrical riding track $a^3$. Each roller 31 has, on the other hand, one riding surface $d^3$ that rolls on the riding track $b^3$ of the inner race 32, and two riding surfaces $c^3$ that roll on the riding tracks $a^3$ of the outer race 33.

The rollers 31 are positioned in a similar way than rollers 1 in the roller bearing assembly $<R>$ illustrated in FIGS. 1 and 2, except that they are inserted into a cage 39, schematically illustrated, having small rollers 38. Each roller 38 has its axis of rotation located on a fictive line binding the axis of rotation of two neighboring rollers 31. The diameter of each small roller 38 is such that its cylindrical surface never contacts the riding track $b^3$.

The roller bearing assembly $<R^4>$ shown in FIGS. 6, 6a and 6b, is similar to the roller bearing assembly $<R>$ shown in FIGS. 1 and 2. This roller bearing assembly $<R^4>$ has eight rollers 41 planetary positioned between an inner race 42, secured on a rotary shaft 47, and an outer race 43. The inner race 42 has an outer cylindrical riding track $b^4$ provided with teeth 46, and the outer race 43 has an inner cylindrical riding track $a^4$ provided with teeth 45. Each roller 41 has, on the other hand, one riding surface $d^4$ provided with teeth 48, that rolls on said riding track $b^4$, said teeth 48 being intended to engage teeth 46 of the riding track $b^4$; and two riding surfaces $c^4$, provided with teeth 44, that roll on said riding track $a^4$, said teeth 44 being intented to engage teeth 45 on the riding track $a^4$.

The radius of the riding track $a^4$ of the outer race 43 is $r_a{}^4$ with respect to the axis of the shaft 47, while the radius of the riding track $b^4$ of the inner race 42 is $r_b{}^4$, again with respect to the axis of the shaft 47.

On the other hand, the radius of the riding surfaces $c^4$ is $r_c{}^4$, with respect to the axis of the roller 41, while the radius of the riding surface $d^4$ is $r_a{}^4$ with respect to the axis of the roller 41. Thus:

riding track $a^4$ has radius $r_a{}^4$
 riding track $b^4$ has radius $r_b{}^4$
 riding surfaces $c^4$ have radius $r_c{}^4$ and
 riding surfaces $d^4$ have radius $r_d{}^4$.

According to the invention, the radii $r_a{}^4$, $r_b{}^4$, $r_c{}^4$ and $r_d{}^4$ must be related to the following equations:

$$r_a{}^4 + r_b{}^4 + r_d{}^4 + r_c{}^4 \text{ and}$$

$$r_a{}^4/r_b{}^4 = r_c{}^4/r_d{}^4$$

Of course, the sizes, shapes and numbers of teeth 44 and 48 of riding surfaces c⁴ and d⁴, and teeth 45 and 46 of riding tracks a⁴ and b⁴, are selected to make the roller bearing assembly <R⁴> operable, and let to the discretion of the skilled workman.

Figure 7:
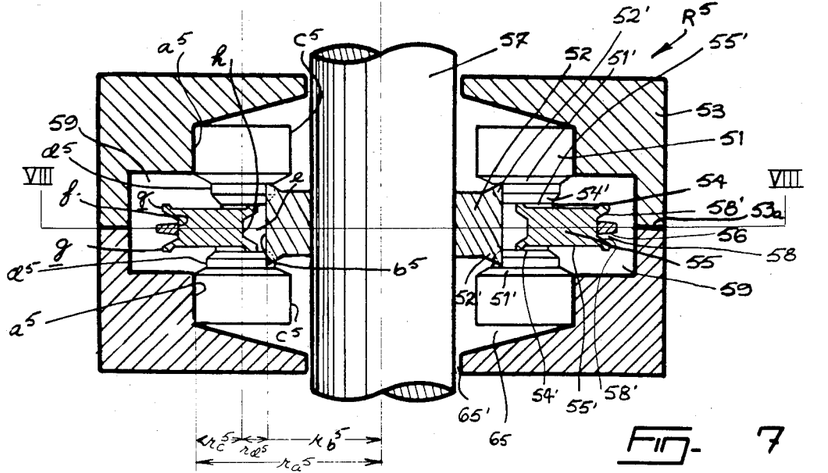
FIG. 7 is a cross-sectional view, taken along line VII—VII of FIG. 8 of a sixth embodiment of a roller bearing assembly according to the invention.
Figures 8, 8A, 8B:
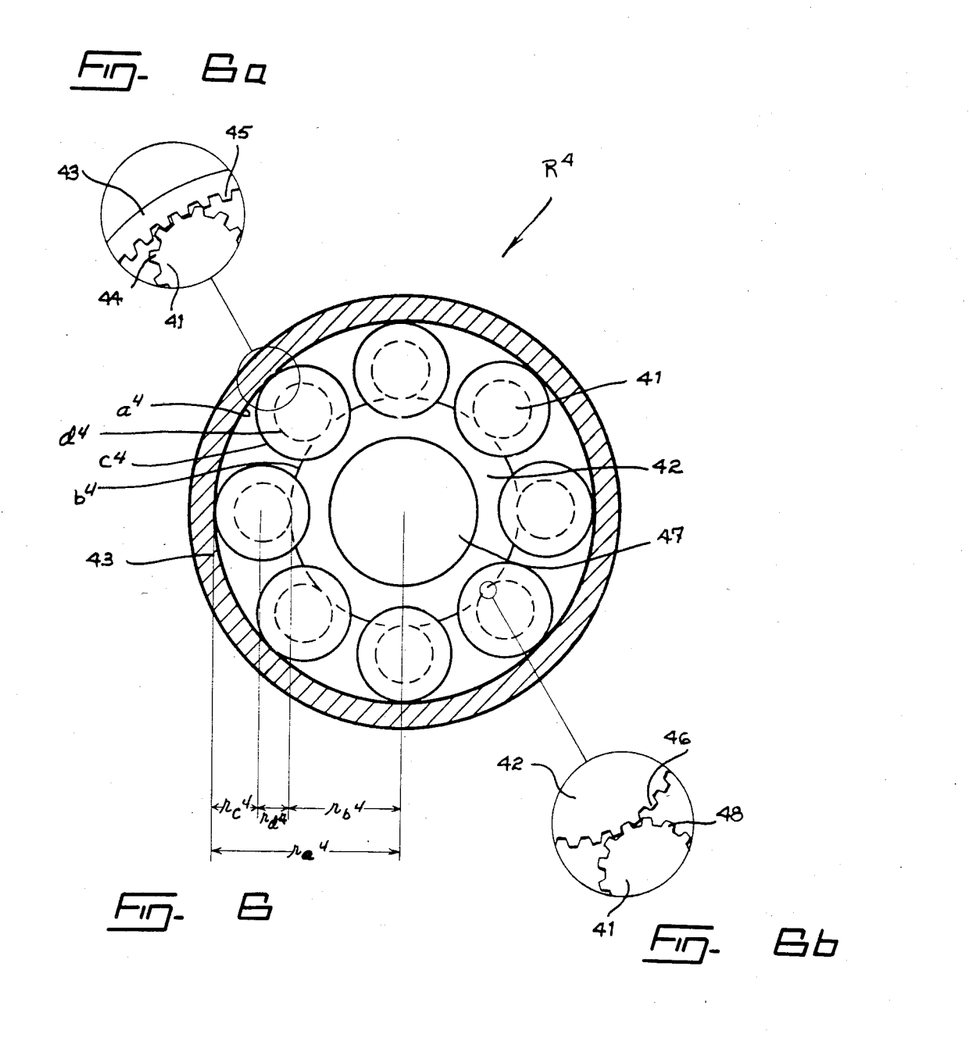
FIG. 8 is a cross-sectional view, taken along line VIII—VIII of FIG. 7, of the shown roller bearing assembly.
Figure 8:
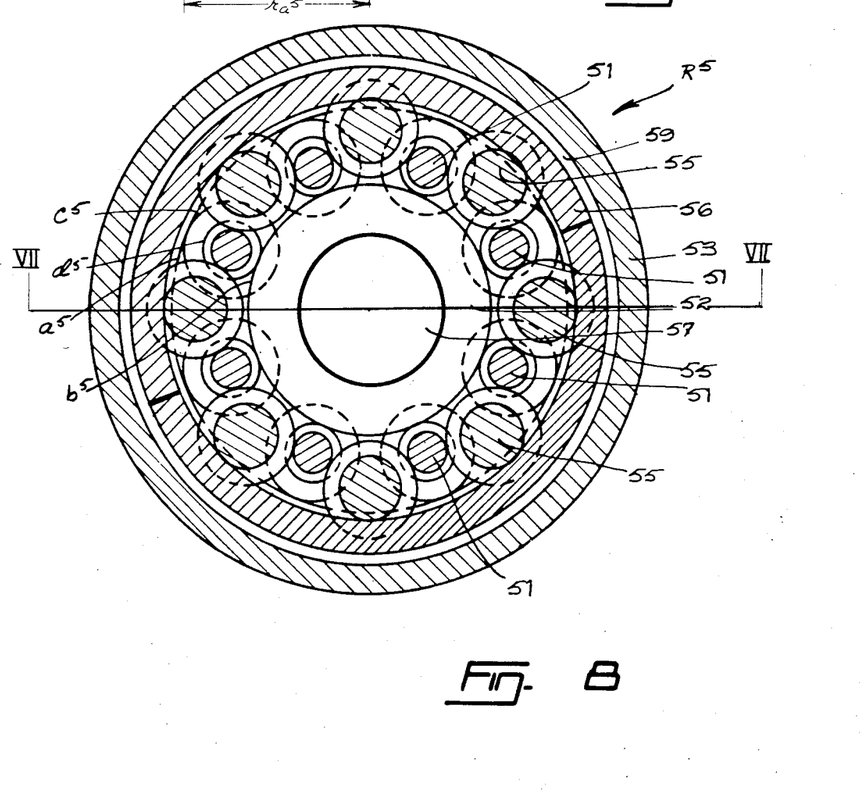
Figure 9:
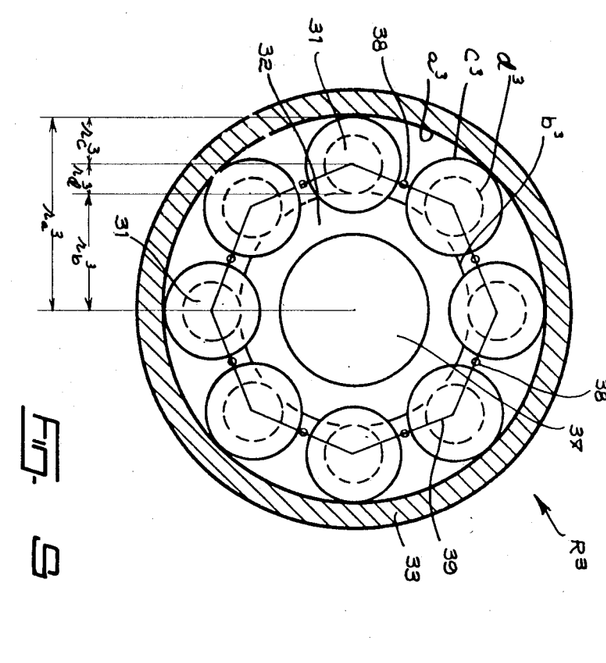

The roller bearing assembly <R⁵>, shown in FIGS. 7 and 8, has eight rollers 51 planetary positioned between an inner race 52, secured on a rotary shaft 57, and an outer race 53. The inner race 52 has an outer cylindrical riding track b⁵ and the outer race 53 has two inner cylindrical riding tracks a⁵ spaced apart by a circumferential groove 59. Each roller 51 has, on the other hand, two riding surfaces d⁵, spaced apart by a circumferential groove 54 having a low depth and a flat bottom, that roll on the riding track b⁵ of the inner race 52; and two further riding surfaces c⁵ that roll on corresponding riding tracks a⁵ of the outer race 53. This race 53 is made of two concentric parts joined along common face 53a, by means well known to the skilled workman.

The riding tracks a⁵ of the outer race 53 define the bottom of a circumferential groove 65 that is formed in the cylindrical surface of the bore 65' of the race 53.

The radius of the riding track b⁵ of the inner race 52 is $r_b{}^5$, with respect to the axis of the shaft 57, while the radius of the riding tracks a⁵ of the outer race 53 is $r_a{}^5$, again with respect to the axis of the shaft 57.

On the other hand, the radius of the riding surfaces c⁵ is $r_c{}^5$, with respect to the axis of the roller 51, while the radius of the riding surfaces d⁵ is $r_d{}^5$ with respect to the axis of the roller 51. Thus:

riding tracks a⁵ have radius $r_a{}^5$
riding track b⁵ has radius $r_b{}^5$
riding surfaces c⁵ have radius $r_c{}^5$ and
riding surfaces d⁵ have radius $r_d{}^5$ According to the invention, radii $r_a{}^5$, $r_b{}^5$, $r_c{}^5$ and $r_d{}^5$ are related to the following equations:

$$r_a{}^5 = r_b{}^5 + r_d{}^5 + r_c{}^5 \text{ and}$$

$$r_a{}^5/r_b{}^5 = r_c{}^5/r_d{}^5$$

With the above relationship, there is minimal amount of sliding between the riding surfaces c⁵ and d⁵ of rollers 51 and the riding track b⁵ of the race 52 and the riding tracks a⁵ of the race 53.

For the purpose of optimizing the reduction of frictions in the roller bearing assembly <R⁵>, the inner race 52 has radial faces 52' that diverge from each other with respect to their center of rotation, in the vicinity of the track b⁵. The riding surfaces c⁵ and d⁵ are separated by radial shoulders 51' that diverge from each other with respect to their center of rotation.

Also, the roller bearing <R⁵> has, in order to keep the rollers 51 equidistant with respect to each other, eight spacing rollers 55 that respectively contact, at once, two neighboring rollers 51 and the crown 56. Each roller 51 has a cylindrical surface of contact (hereinafter named riding track e) that is defined by the flat bottom of the groove 54. The crown 56 has a cylindrical surface of contact (hereinafter named riding track f). Each spacing rollers 55 has two cylindrical surface of contact (hereinafter named riding surfaces g) spaced apart by a circumferential groove 58 having a low depth and a flat bottom, said flat bottom defining another cylindrical surface of contact (hereinafter named a riding surface h). The riding surfaces g of one spacing roller 55 simultaneously roll on the riding track e of two neighboring rollers 51, while said riding surface h rolls on the riding track f of the crown 56. Of course, this crown 56 exclusively contacts (by its riding track f) the riding surface h of each spacing roller 55.

The circumferential groove 59 formed in the race 53, defines a wide enough passageway where are housed and moving the spacing rollers 55 and the crown 56.

Still for optimizing the reduction of friction in the roller bearing assembly <R⁵>, the groove 54 has radial faces 54' connecting its riding surface e with its riding surfaces d⁵. These radial faces 54' diverge from each other with respect to their center of rotation. Each spacing roller 55 has two riding surfaces g that are bordered by radial faces 55'. These faces 55' connect said riding surfaces g and the axis of the roller 55, and diverge from each other, in the vicinity of said surfaces g, with respect to their center of rotation. The groove 58 has radial faces 58' that connect the riding surface h and the riding surfaces g, and move away from each other with respect to their center of rotation. The crown 56 has a riding track f bordered by radial faces that diverge from each other toward said track f.

The crown 56 is made of two segments joined by means well known to the skilled workman during the assembling of the rollers bearing <R⁵>. Also, as the riding surface h of the spacing rollers 55 have the same diameter, they have the same speed and the sliding between said spacing rollers 55 and said crown 56 are avoided. Of course, this roller bearing assembly <R⁵> is assembled according to the usual technics of skilled workman.

In use, pratically no sliding is noted between the riding surfaces of rollers 1(11, 21, 31 and 51) and the riding tracks of races 2(12, 22, 32 and 52) and 3(13, 23, 33 and 53). No sliding may be noted in the roller bearing assembly R⁴ because the presence of teeth.

In this regard, it should be noted that, making abstraction of unavoidable machine-margins, the distance travelled by the riding surfaces d (d¹, d², d³, d⁴ or d⁵) of a roller 1(11, 21, 31, 41 or 51) on the riding tracks b (b¹, b², b³, b⁴ or b⁵) of the race 2 (12, 22, 32, 42 or 52) and the distance travelled by the riding surfaces c (c¹, c², c³, c⁴ or c⁵) of a roller 1 (11, 21, 31, 41 or 51) on the riding tracks a (a¹, a², a³, a⁴ or a⁵) of the race 3 (13, 23, 33, 43 or 53), involve the same number of revolution for the rollers 1 (11, 21, 31, 41 or 51).

What is claimed is:

1. A roller bearing assembly comprising an inner race having an outer cylindrical riding track; an outer race, coaxial with said inner race, having an inner cylindrical riding track facing said outer riding track of said inner race; a series of rollers mounted between said riding tracks; wherein each of said rollers has at least two cylindrical riding surfaces of different radii, the cylindrical riding surface of longer radius exclusively contacting said outer race riding track while the cylindrical riding surface of smaller radius exclusively contacts said inner race riding track; wherein the radius of said riding track of said outer race equals the sum of the radius of the riding track of the inner race plus said longer and smaller radii of said riding surfaces of said rollers; wherein the ratio of the radius of said riding track of said outer race over the radius of said riding track of said inner race equals the ratio of said longer radius over said shorter radius; wherein between each of said rollers is positioned at least one spacing roller having a cylindrical surface of contact of such a diameter that it prevents said riding surfaces of longer radius of two neighboring rollers to come into mutual contact, and at least one crown having one cylindrical surface of contact; wherein each of said spacing rollers at once contacts one riding surface of each corresponding rollers and said surface of contact of said crown, said crown being intended to keep said spacing rollers against their corresponding rollers and being exclusively in contact with said spacing rollers; wherein each of said rollers of said assembly is provided in a portion of one of its riding surface with a circumferential groove of small depth, said groove having a flat bottom and radial faces connecting said bottom and said riding surface, and receiving said cylindrical surface of contact of corresponding spacing rollers; and wherein said cylindrical surface of contact of said spacing rollers is bordered by radial faces diverging from each other, with respect to the center of rotation of said spacing rollers, while said radial faces of said groove of said rollers of said assembly are diverging from each other, with respect to the center of rotation of said roller, to whereby avoid friction therebetween.

2. A roller bearing assembly comprising an inner race having an outer cylindrical riding track; an outer race, coaxial with said inner race, having an inner cylindrical riding track facing said outer riding track of said inner race; a series of rollers mounted between said riding tracks; wherein each of said rollers has at least two cylindrical riding surfaces of different radii, the cylindrical riding surface of longer radius exclusively contacting said outer race riding track while the cylindrical riding surface of smaller radius exclusively contacts said inner race riding track; wherein the radius of said riding track of said outer race equals the sum of the radius of the riding track of the inner race plus said longer and smaller radii of said riding surfaces of said rollers; wherein the ratio of the radius of said riding track of said outer race over the radius of said riding track of said inner race equals the ratio of said longer radius over said shorter radius; wherein between each of said rollers is positioned at least one spacing roller having a cylindrical surface of contact of such a diameter that it prevents said riding surfaces of longer radius of two neighboring rollers to come into mutual contact, and at least one crown having one cylindrical surface of contact; wherein each of said spacing rollers at once contacts one riding surface of each corresponding rollers and said surface of contact of said crown, said crown being intended to keep said spacing rollers against their corresponding rollers and being exclusively in contact with said spacing rollers; wherein each of said spacing rollers of said assembly is provided in a portion of its cylindrical surface of contact, with at least one circumferential groove of small depth, this groove having a flat bottom and radial faces connecting said bottom and said cylindrical surface of contact, and receiving the cylindrical surface of contact of a corresponding crown; and wherein said cylindrical surface of contact of said crown is bordered by radial faces diverging from each other, toward said cylindrical surface of contact, while said radial faces of said groove of said spacing rollers diverge from each other, with respect to the center of rotation of said spacing rollers, to thereby avoid friction therebetween.

* * * * *